United States Patent
Dow et al.

(10) Patent No.: US 9,686,247 B2
(45) Date of Patent: Jun. 20, 2017

(54) DISTRIBUTED COMPUTING UTILIZING HOMOMORPHIC ENCRYPTION

(71) Applicant: International Business Machines Corporation, Armonk, NY (US)

(72) Inventors: Andrew Dow, Chicago, IL (US); Eli M. Dow, Poughkeepsie, NY (US); James P. Gilchrist, Poughkeepsie, NY (US); Gabriel J. Perez Irizarry, Highland, NY (US); Gary S. Littlefield, Saugerties, NY (US); Katrin Nagel, Malsch (DE); Nickalaus A. Painter, Constableville, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/749,079

(22) Filed: Jun. 24, 2015

(65) Prior Publication Data
US 2016/0380761 A1 Dec. 29, 2016

(51) Int. Cl.
*H04K 1/00* (2006.01)
*H04L 9/00* (2006.01)
*H04L 9/28* (2006.01)
*H04L 29/06* (2006.01)

(52) U.S. Cl.
CPC .......... *H04L 63/0428* (2013.01); *H04L 9/008* (2013.01); *H04L 2209/24* (2013.01)

(58) Field of Classification Search
CPC ...................................... H04L 9/008
USPC .................................................. 380/29, 28
See application file for complete search history.

(56) References Cited

U.S. PATENT DOCUMENTS

| | | | |
|---|---|---|---|
| 7,293,059 B2 | 11/2007 | Pearson | |
| 8,381,272 B1 | 2/2013 | Nelson et al. | |
| 8,429,421 B2 * | 4/2013 | Chase | G06F 21/6227 380/277 |
| 8,484,279 B1 | 7/2013 | Cole | |
| 8,539,592 B2 * | 9/2013 | Kishore | H04L 63/0428 705/51 |
| 8,868,695 B2 * | 10/2014 | Grube | H04L 67/1097 709/220 |

(Continued)

OTHER PUBLICATIONS

Shucheng Yu; Achieving Secure, Scalable, and Fine-grained Data Access Control in Cloud Computing; IEEE: 2010; p. 1-9.*

(Continued)

*Primary Examiner* — Monjour Rahim
(74) *Attorney, Agent, or Firm* — Cantor Colburn LLP; Steven Chiu (57) ABSTRACT

A method for determining a compute amount contributed by a device is provided. The method comprises receiving encrypted data from a processor of a customer system and parsing the encrypted data into a plurality of encrypted subsets. Then, the method associates a token specific to the device with an encrypted subset of the plurality of encrypted subsets to produce a packaged subset. The packaged subset is sent to the device. In response, a processed packaged subset that includes the token is received. The compute time contributed by the device is determined from the token of the processed packaged subset.

11 Claims, 6 Drawing Sheets

(56) References Cited

U.S. PATENT DOCUMENTS

| | | |
|---|---|---|
| 9,118,631 B1* | 8/2015 | Yung ................. G06F 21/42 |
| 2009/0318209 A1 | 12/2009 | Gwaltney |
| 2012/0150657 A1 | 6/2012 | Rubinstein et al. |
| 2012/0159180 A1* | 6/2012 | Chase ............... G06F 21/6227 713/183 |
| 2012/0254280 A1* | 10/2012 | Parker, II ............ G06F 9/5044 709/201 |
| 2013/0085916 A1 | 4/2013 | Abbe et al. |
| 2016/0019396 A1* | 1/2016 | Davis ................ G06F 21/6209 713/193 |

OTHER PUBLICATIONS

List of IBM Patents or Patent Applications Treated as Related; (Appendix P), Filed Dec. 13, 2016; 2 pages.
Andrew Dow, et al., Pending U.S. Appl. No. 14/847,467 entitled Distributed Computing Utilizing Homomorphic Encryption, filed Sep. 8, 2015.

* cited by examiner

DISTRIBUTED COMPUTING UTILIZING HOMOMORPHIC ENCRYPTION

BACKGROUND

The present disclosure relates generally to distributed computing, and more specifically, to distributed computing utilizing homomorphic encryption.

In general, distributed computing is when a large computation is divided among a multiplicity of computing devices so that each device can contribute processing power to perform pieces of the large computation to output a processing rate that is faster than if a single computing device performed this large computation alone. At present, common distributed computing environments include university systems that enable different university labs to collectively perform large computations and voluntary distributed systems that allow individuals to subscribe their devices to these environments for altruistic reasons.

SUMMARY

Embodiments include a method, system, and computer program product for determining a compute amount contributed by a device is provided. The method comprises receiving encrypted data from a processor of a customer system and parsing the encrypted data in a plurality of encrypted subsets. Then, the method associates a token specific to the device with an encrypted subset of the plurality of encrypted subsets to produce a packaged subset. The packaged subset is sent to the device. In response, a processed packaged subset that includes the token is received. The compute time contributed by the device is determined from the token of the processed packaged subset.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to leveraging homomorphic encryption to incentivize participation of devices in massive computational operations in a distributed computation system.

While contemporary distributed computing environments provide a relatively fast computational rate, a wealth of compute power remains untapped in public markets. For example, the collective compute power of all smartphones on any telecommunication provider's network could provide a potentially exponential speed advantage when computing large calculations, such as deciphering proteins, calculating cosmic models, modeling cancer cells, etc. However, at present, distributed computing lacks the security and tracking to incentivize entities outside of universities or entities without altruistic ideals to participate in such computational activities.

In general, a distributed computation system is a hardware/software system across a plurality of devices that communicate and coordinate their resources to achieve a common goal (e.g., to perform a massive computational operation). Resources or compute power of these devices can be grouped into categories such as processing power (e.g., core processing power like a central processing unit, a graphics processing unit, and other processing technology), memory power (e.g., cache, random access memory, storage, etc.), and input/output power (e.g., hardwired and/or wireless connectivity). A total compute power of the distributed computation system is a combination of all the resources contributed/donated by the devices. The total compute power, thus, depends on number of participating devices and a compute power amount of each participating device.

Embodiments herein securely embed/interleave a revenue generating computation into a distributed computation system to track the number of participating devices and the compute power amount of each participating device. For example, the revenue generating computation leverages homomorphic encryption to securely deliver data of the massive computation operation. Homomorphic encryption enables computations to be carried out on ciphertext, thus generating an encrypted result without decrypting the content which, when decrypted, matches the result of operations performed on the plaintext (i.e., homomorphic encryption is an encryption that allows processing on data without decrypting the data). The revenue generating computation in turn receives homomorphic encrypted data, parses the data into subsets assigned to the participating devices, and associates a token with each subset. Each token is particular to each participating device so that a respective compute power amount can be adequately tracked by the revenue generating computation. In one embodiment, the revenue generating computation utilizes the token to track the compute power amount of each participating device by monitoring a frequency of participation, a duration of participation, and a resource utilization of that device.

With the compute power amount of each participating device determined, the revenue generating computation can individually apply a financial benefit to each owner of each participating device. In this way, as the compute power amount of each participating device increases or decreases in frequency, duration, and resource utilization, the revenue generating computation increase or decreases the financial benefit.

The financial benefit can be matched/equated by the revenue generation computation to enhanced data services and/or computational generated currencies, which are further utilized to incentivize participation of the devices. Thus, an owner of a device connected to the distributed computational system can be incentivized to participate in any massive computational operation due to the revenue generating computation guaranteeing faster data connections, increased bandwidth thresholds, monetary payments, etc. that are proportional to the computational generated currencies.

Figure 1:
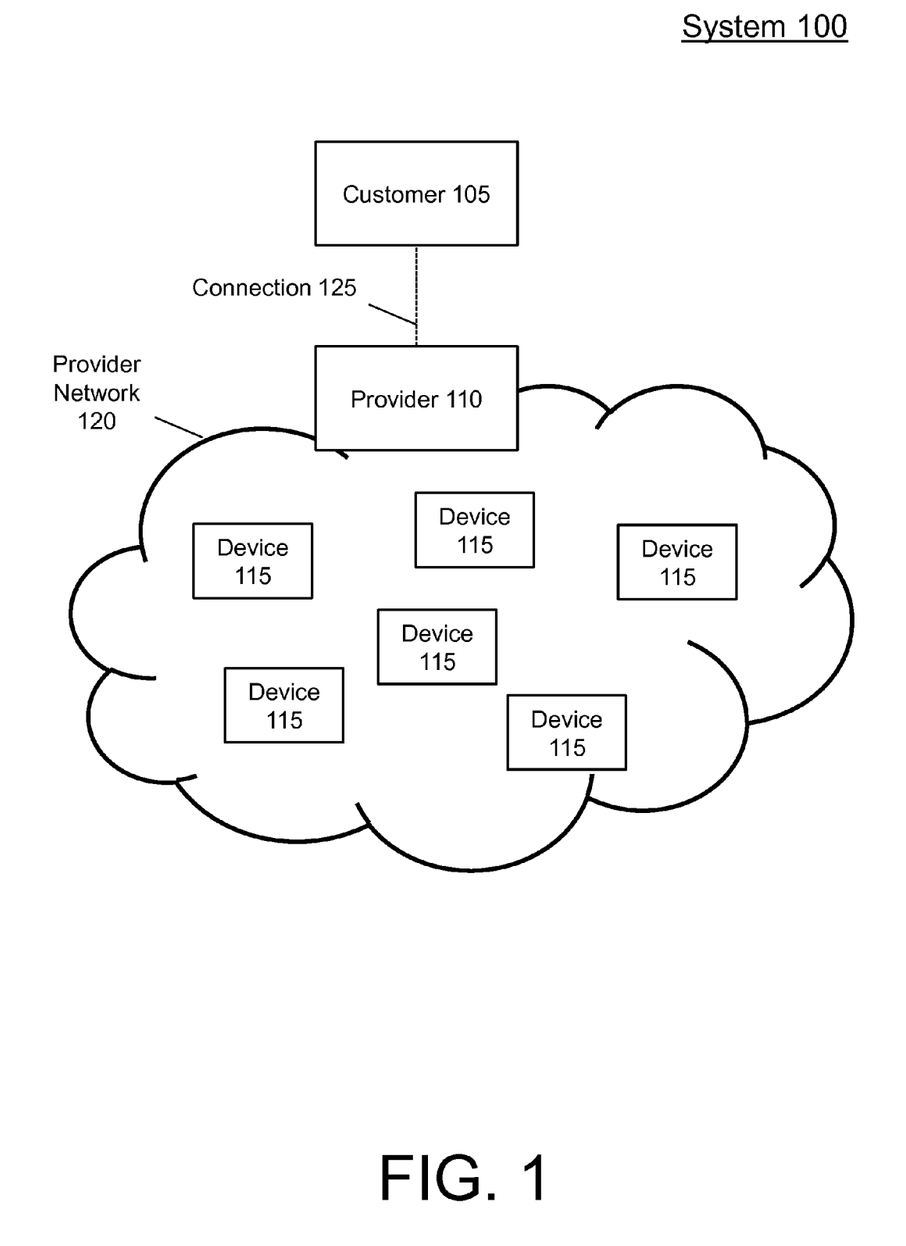
FIG. 1 depicts a distributed computational system in accordance with an embodiment of the present invention.

Turning now to FIG. 1, the distributed computational system is generally shown as a system 100 in accordance with an embodiment. The system 100 can further be a desktop and/or mobile device environment or a cloud computing environment described below. The system 100 includes a customer 105, a provider 110, a plurality of devices 115, a provider network, and a connection 125. The plurality of devices 115 logically reside in the provider network 120, which is managed by the provider 110, that supports connectivity and communications for the devices 115. The connection 125 supports connectivity and communications between the customer 105 and the provider 105.

The system 100 is structured to incentivize participation by the devices 115 in a massive computational operation of the customer 105. That is, the system 100 creates a two-tiered market. A first market tier enables the provider 110 to offer via the revenue generating computation enhanced data services (storage or transmission rates) and/or monetary payments (credit towards service bill) to the subscribers/users that have devices 115 on the provider network 120 for participation in any massive computational operation. A market second tier enables the provider 105 to offer this computational service to the customer 105 for financial compensation.

The customer 105 may be any computing system (e.g., a computer system/server 412 as described below) with a massive computational operation. This computing system can generally be associated with and/or owned by a business, educational institution, government agency, or the like. For example, a multi-media company may own a computing system (represented by the customer 105) that has raw data that requires large scale rendering operations to generate a three-dimensional animated movie with a 4 k resolution (i.e., a massive computation operation).

The provider 110 may also be any computing system (e.g., a computer system/server 412 as described below) with the revenue generating computation installed thereon. Further, this computing system can be associated with and/or owned by an internet service provider, telecommunication company, educational institution, or the like. For example, a telecommunication company may own a computing system (represented by the provider 110) that manages the connectivity and communications of a cellular network (represented as the provider network 120), such that subscribing mobile devices (e.g., devices 115, which are further described with respect to computing devices 554 below) can make phone calls, video calls, access the Internet, etc.

Figure 2:
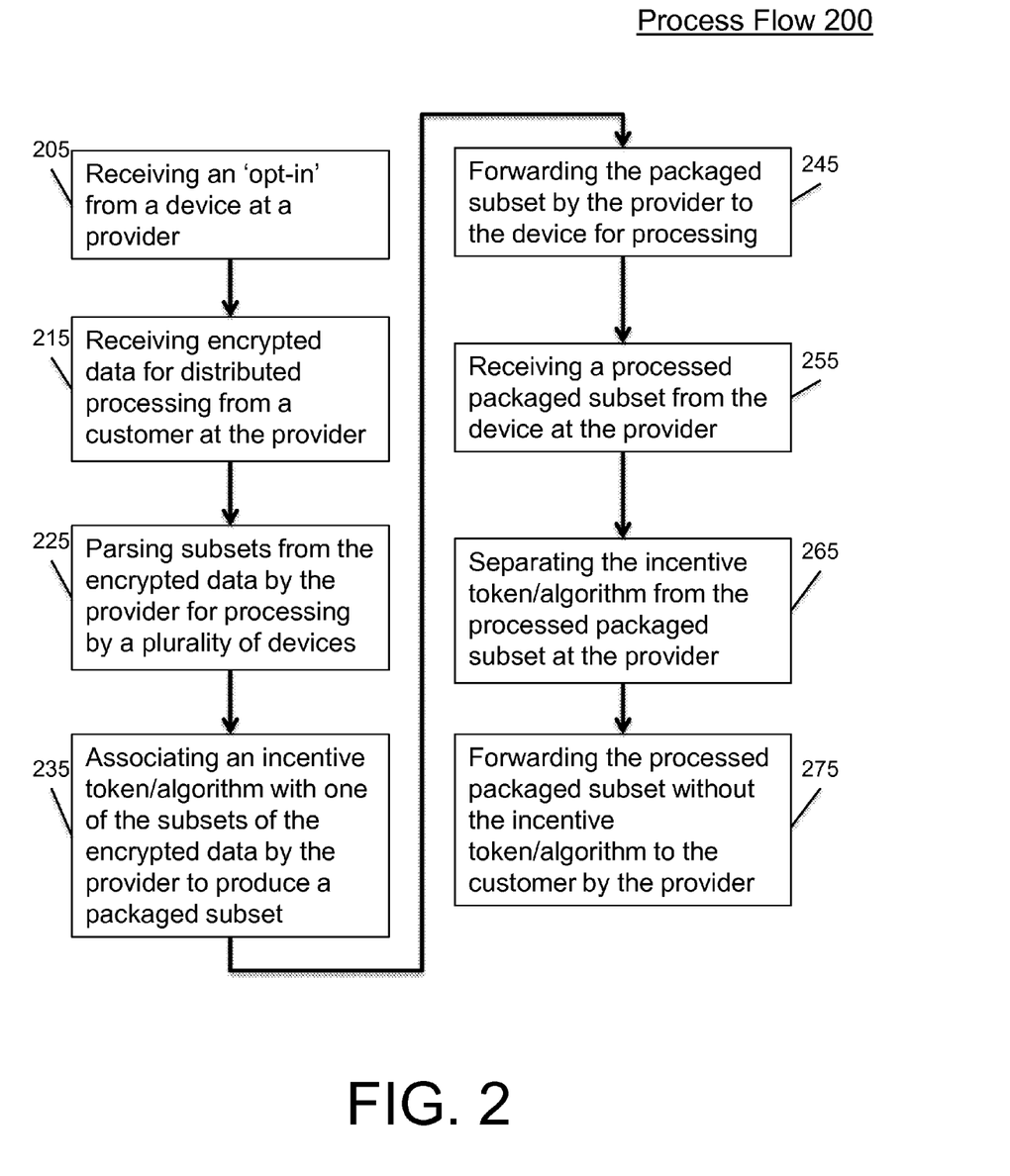
FIG. 2 depicts a process flow executed within a distributed computational system in accordance with an embodiment of the present invention.

In accordance with one embodiment, an operation of the system 100 is described with respect to FIG. 2. The operation is illustrated as a process flow 200 that begins at block 205.

At block 205, the provider 110 receives an 'opt-in' from one of the plurality of devices 115. An 'opt-in' is an indication from a particular device 115 that a user, who owns that device, has chosen to participate in any massive computational operation provided to that particular device 115 by the provider 110. For example, if the particular device 115 is a smartphone and the provider 110 is a telecommunications company, the user indicates consent (through an application or a settings menu, via a text message to a provider 110, or selecting a link of an email resident on the smartphone) for the provider 110 to utilize a local compute power of that smartphone. As a portion or all of the plurality of devices 115 provide consent to the provider 110, a total compute power is accumulated for the provider network 120. Note that, upon opting in, a program can be delivered and installed on the consenting device 115 so that a packaged subset may be processed when received. The program can be run isolated from everything else on the device via either a container, virtual machine, or other isolation process to guarantees that the program does not do anything with the user's data on the device. Further, the program can relate to a specific operation if the 'opt-in' includes a designation of a specific massive computational operation. In this way, users can not only choose to participate in the distributed computational system, they may also choose the massive computational operation. Also, the program can be configured as desired by the users, such as by throttling a rate at which this program can be run, by selecting a time when the program can be run (e.g., when the device is on battery vs plugged in, always in the background, only when the user brings it to the foreground, and the like), etc.

Next, at block 215, the provider 110 receives encrypted data for distributed processing from the customer 105. The encrypted data can be data of a massive computational operation that was previously encrypted via homomorphic encryption. In this way, the encrypted data is securely passed from the customer 105 to the provider 110, i.e., the application of homomorphic encryption widen applicability of the distributed processing by ensuring data security for the customer 105. For example, homomorphic encryption enables a distribution of work to crowd sourced participants with a fundamental nature of the work obscured. Note that the amount of encrypted data, the timeline for computing, the conditions of communicating unprocessed and processed encrypted data, etc. can be negotiated beforehand by the customer 105 and the provider 115.

At block 225, the provider 110 parses the encrypted data into subsets for processing by the plurality of devices 115. For example, the revenue generating computation of the provider 110 performs an accounting of all the devices 115 that have consent to participate in any massive computational operation. This accounting by the revenue generating computation determines which devices 115 receive which subsets for processing.

In another embodiment, the encrypted data may not be able to be parsed by the provider 110 (e.g., in some cases, the provider 110 could only parse the encrypted data if the customer 105 provides code that can parse the encrypted data without decrypting the data). In turn, the customer 105 may deliver small packets of data as the encrypted data.

Next, at block 235, the provider 110 associates an incentive token/algorithm with one of the subsets of the encrypted data to produce a packaged subset. The incentive token/algorithm is a mechanism for the revenue generating computation to track an actual participation of the one device 115. For example, the revenue generating computation we can interleave a bitcoin or other computational mining token that yields results amongst the computational goal of the distributed computing collaboration. Note that since each type of computation is encrypted, devices 115 do not know that they are in essence performing a core computation as well as, with small probability, performing a computation necessary to incentivize one or more of the participants. Then, at block 245, the provider 110 forwards the packaged subset to the one of the plurality of devices 115 for processing. The program running on the one of the plurality of devices 115, in turn, performs the computation on the encrypted data of the packaged subset without ever decrypting the data. In this way, the one of the plurality of devices 115 does not procure knowledge of the encrypted data. Upon distributing encrypted data, if the program for processing the received packaged subset is not on the one device 115, the program can be installed and/or uploaded. Note that the program can be run in its own container to isolate it from everything else that is running on the one device 115. In this way, a user of the one device 115 is ensured that the program in its own container cannot reference any user data on the one device 115. Also, while the program can run in its own container, the program can run under its own virtual machine at a higher computing expense.

At block 255, the provider 110 receives a processed packaged subset from the one of the plurality of devices 115. The processed packaged subset as processed by the one of the plurality of devices 115 may then be validated. For example, the provider 110 may utilize a checksum or cross check the computation against a redundantly running computation on another device within the system 100. Then, at block 265, the provider 110 separates the incentive token/algorithm from the processed packaged subset. The incentive token/algorithm includes compute power information as to frequency, duration, and resource utilization of the one of the plurality of devices 115. Then, at block 275, the provider 110 forwards the processed packaged subset without the incentive token/algorithm to the customer 105.

Figure 3:
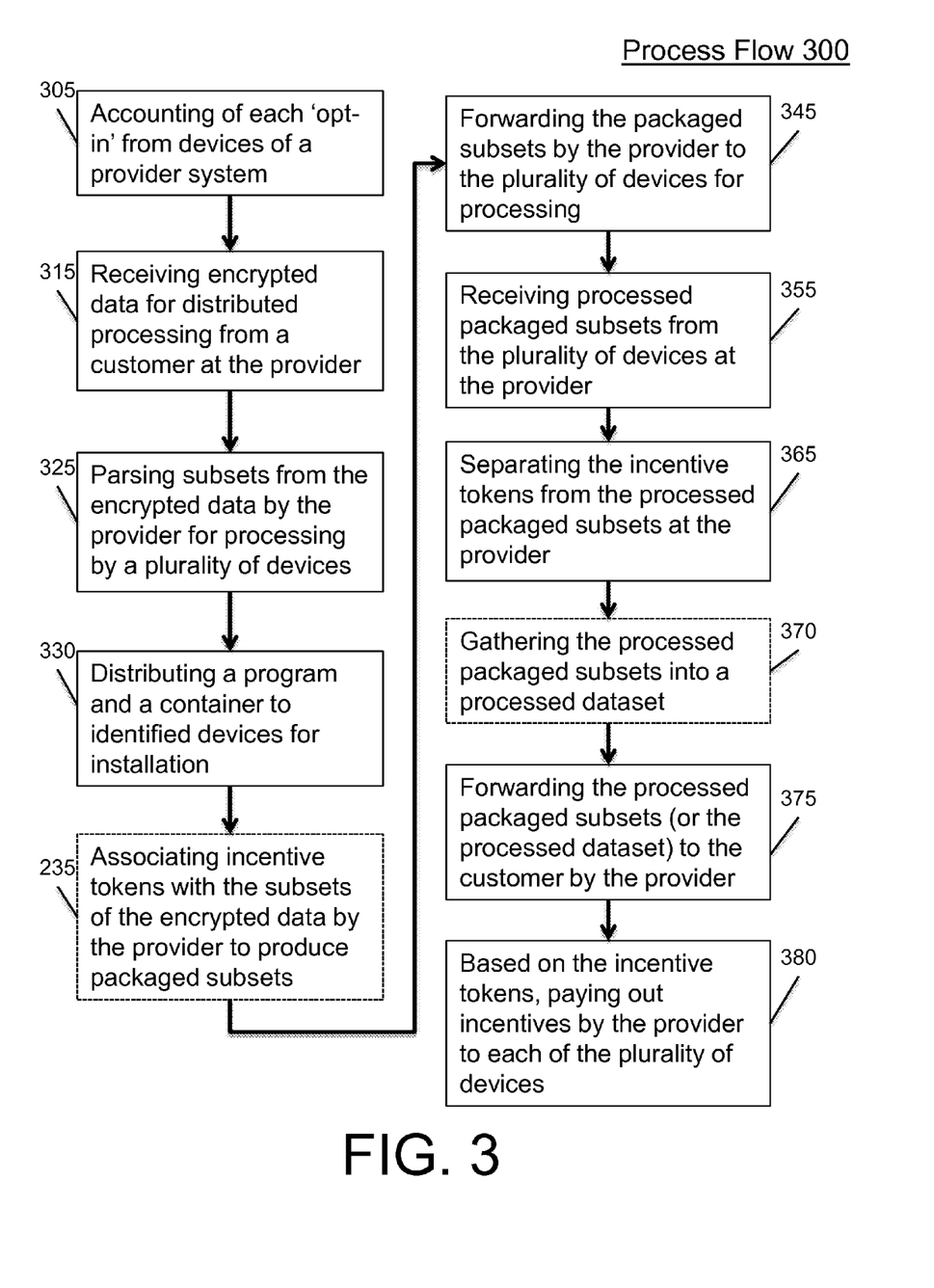
FIG. 3 depicts another process flow executed within a distributed computational system in accordance with an embodiment of the present invention.

In accordance with another embodiment, an operation of the system 100 is described with respect to FIG. 3. The operation is illustrated as a process flow 300 that begins at block 305.

That is, at block 305, the provider 110 performs an accounting of each 'opt-in' from the plurality of devices 115 in the provider network 120. Accounting by the provider 110 can include operations by the revenue generating computation that survey a status of each of the plurality of devices 115. The status may be stored in a data structure of a memory of the provider 110 or a storage facility/sub-system of the provider network 115. The status can includes consent status (e.g., yes/no), participation preferences (e.g., which calculations to subscribe to), limits on participation time (e.g., restrict participation to evenings only), limits on participation amount (e.g., not to exceed a certain processing power), 'opt-in' method (e.g., indication through an application or a settings menu, via a text message to a provider 110, or by selecting a link), etc. The status may also indicate whether a device includes an installed program for processing subset of encrypted data.

Next, at block 315, the provider 110 receives encrypted data for distributed processing from the customer 105. At block 325, the provider 110 parses the encrypted data into subsets for processing by the plurality of devices 115. For example, the revenue generating computation of the provider 110 utilizes the status of each of the plurality of devices 115 to parse and assign subset of the encrypted data. In this way, the subsets of encrypted data may be sized proportional to each device's participation commitment as defined in a corresponding status. In another embodiment, the customer 105 delivers small packets of data as the encrypted data. Thus, at blocks 315 and 325, the provider 110 can receive and assign the small encrypted packets to each of the plurality of devices 115 according to the corresponding status.

Next, at block 330, the provider 110 distributes a program and a container to any devices of the plurality of devices 114 that do not have the program and the container. That is, if a corresponding status indicates that the program for processing the received packaged subset was not on the one device 115, the program can be distributed by the provider 110 and installed by the device 115. In one embodiment, the program can be distributed and installed when the provider 110 forwards the packaged subset (see block 345).

Next, at block 335, the provider 110 may optionally (as indicated by the dashed box) associate incentive tokens with the subsets to produce packaged subsets. In one embodiment, the provider 110 may rely on the installed program of the device to determine the participation amount of that device and forward that participation as an attached token (see block 555). In another embodiment, the provider 110 may both provide the incentive token and rely on the program to determine the participation amount, such that the incentive token and the participation amount can be reconciled on at the provider 110 for accuracy after processing.

Then, at block 345, the provider 110 forwards the packaged subsets to the plurality of devices 115 for processing. At block 355, the provider 110 receives processed packaged subsets from the plurality of devices 115. The processed packaged subsets may include the incentive tokens originated at the provider 110 and/or incentive tokens originated by the programs of the devices 115.

Then, at block 365, the provider 110 separates the incentive tokens from the processed packaged subset. The incentive tokens include compute power information as to frequency, duration, and resource utilization of the plurality of devices 115. The compute power information or work measurements may be in subsets of work completed, amount of processing time, or another measurement defined by the provider 115.

At block 370, the provider 110 may optionally (as indicated by the dashed box) perform a gathering of the packaged subsets for sending to the customer 105. The gathering may collect the packaged subsets in data chucks based on predetermined thresholds. In one embodiment, the provider may return to the customer 105 each packaged subset as received from a device 115 without performing a gathering.

Then, at block 375, the provider 110 forwards the processed packaged subset without the incentive tokens to the customer 105 (e.g., either based on the gathering or as the packaged subsets are received). At block 380, the provider 110 may pay out an incentive to each of the plurality of devices 115. Note that, a user does not have to be 'paid' for every packet or subset of work done as the packet count may be as low as 1 and can be as high as defined by the provider 115. User may be compensated based upon a corresponding device reaching a predefined plateau, for every so many packets of work done. In another embodiment, user may be incentivized but monetary giveaways based on participation over the course of the day, week, month, etc. In another embodiment, the provider 110 can subdivide financial compensation across the participants equally or in part according to a payout schedule (e.g., a high value lottery or mass incremental payments).

It will be appreciated that embodiments of the present invention may be a system (e.g., implemented on a cloud computing environment), a method, and/or a computer program product. Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The computer program product may include a computer readable storage medium (or media) having computer readable program instructions thereon for causing a processor to carry out aspects and/or embodiments of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
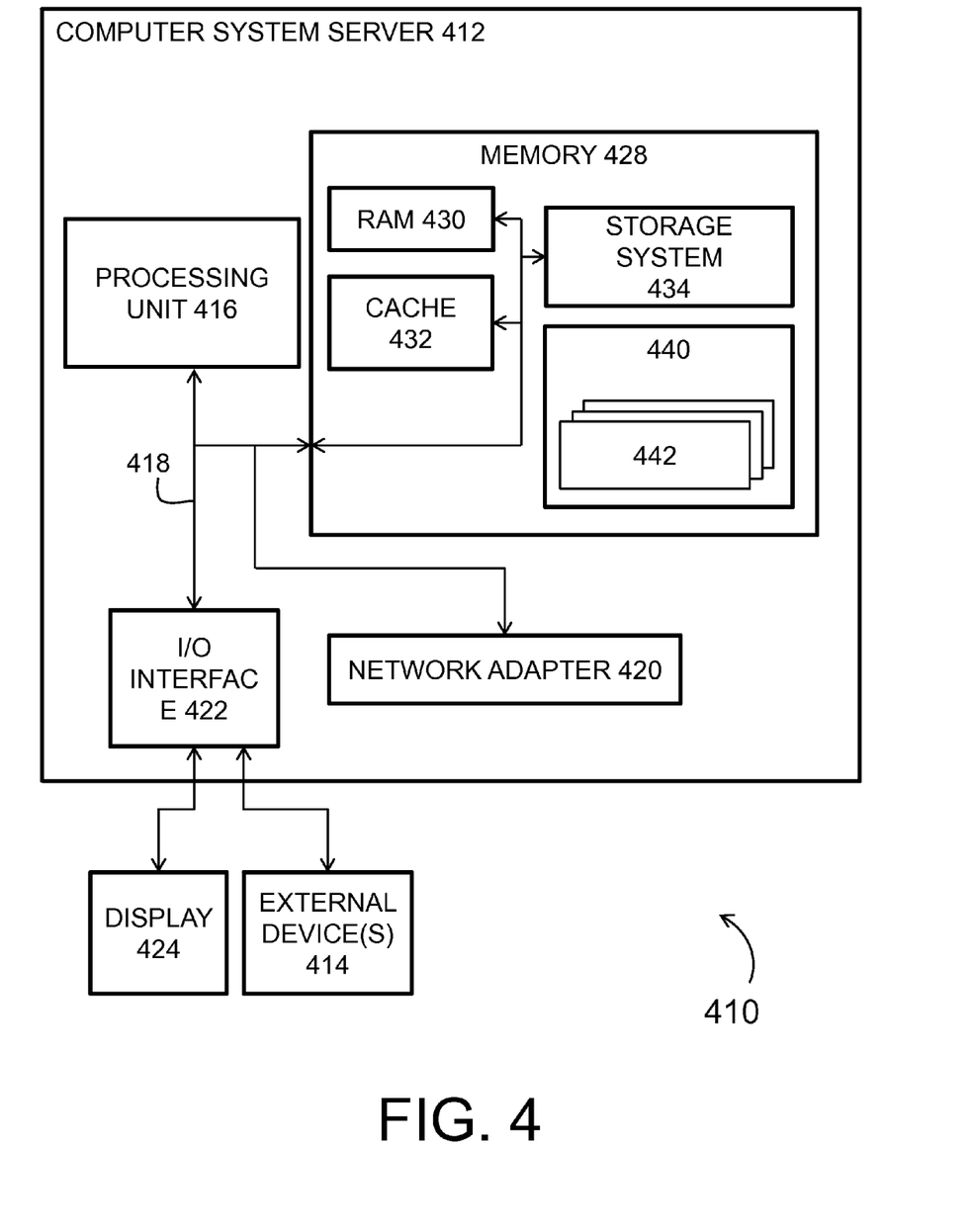
FIG. 4 depicts a cloud computing node in accordance with an embodiment of the present invention.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
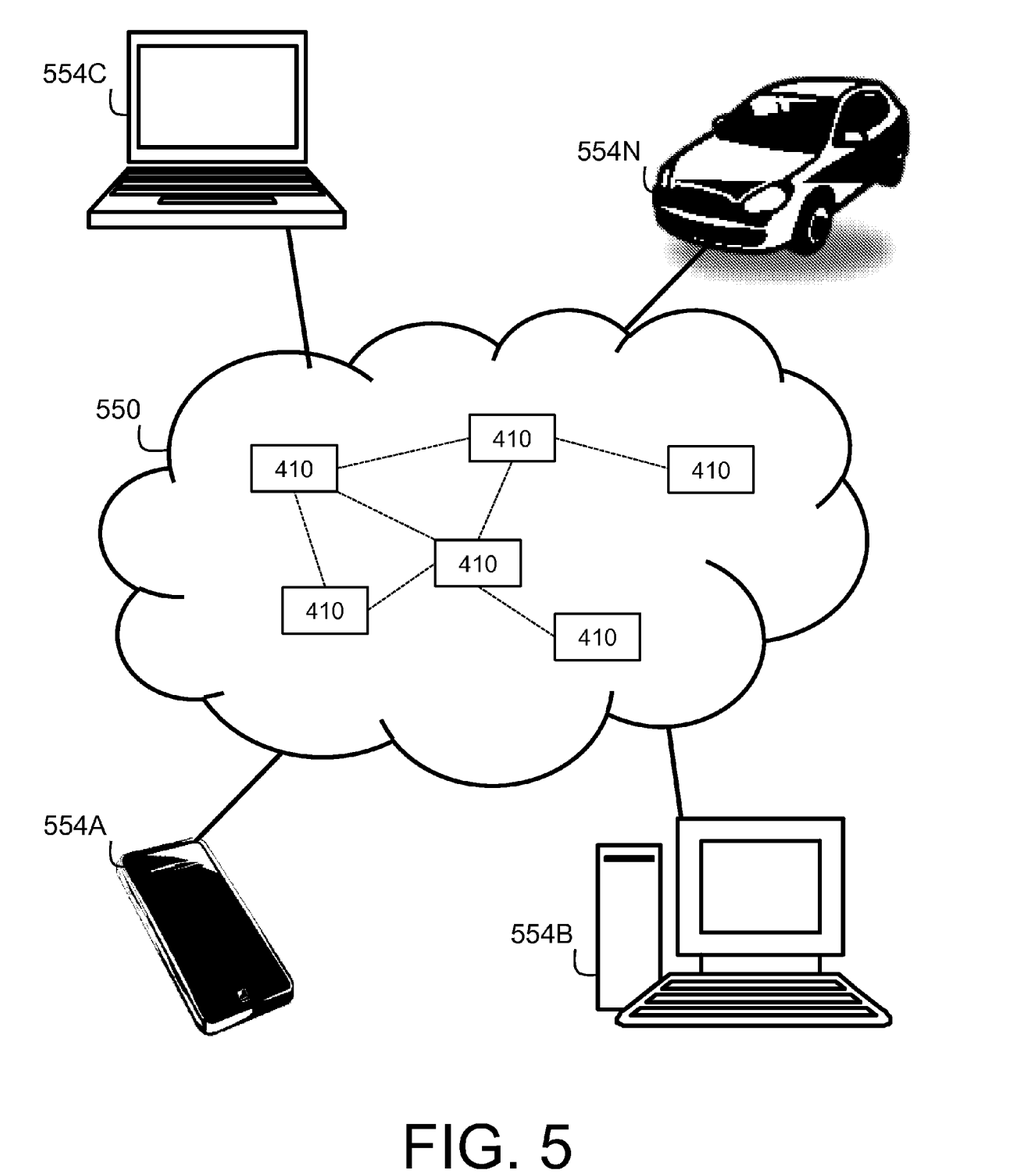
FIG. 5 depicts a cloud computing environment in accordance with an embodiment of the present invention.

Referring now to FIG. 5 illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
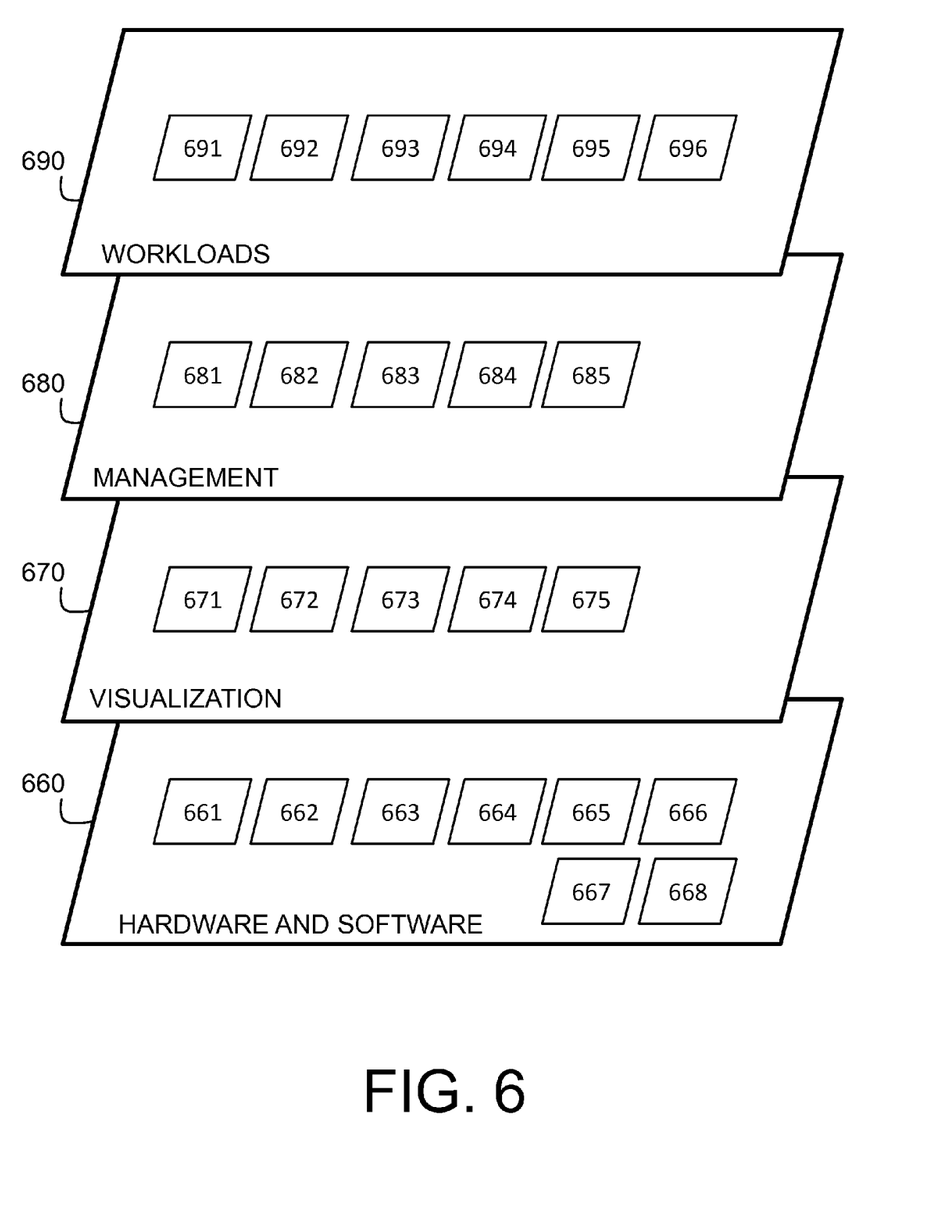
FIG. 6 depicts abstraction model layers in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 73, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources.

In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and mobile desktop 696.

Embodiments herein include the technical effects and benefits of combining two tiers of incentives to harness an excess distributed computing capacity presented by a proliferation of mobile devices, while applying an emerging encryption technique (e.g., homomorphic encryption) to ensure data security for a vast variety of applications by performing computations on encrypted data without decrypting the data. These technical effects and benefits further provide an increase of participation in mobile device discrete distributed computing systems, a decrease in costs of computation-heavy research endeavors, and an increase in mobile hardware capacity utilization. Additionally, embodiments herein, by executing on encrypted data via homomorphic encryption (which is presently a relatively really slow program execution process), tie together a distributed system, an encryption/decryption tool, and a multi-tiered business incentive model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for determining a compute amount contributed by a device, the computer program product comprising a non-transitory computer readable storage medium having program instructions embodied therewith, the program instructions executable by a hardware processor to cause the hardware processor to perform:
   receiving encrypted data from a hardware processor of a customer system, wherein the encrypted data is data encrypted via homomorphic encryption;
   parsing the encrypted data into a plurality of encrypted subsets to proportionally size an encrypted subset of the plurality of encrypted subsets to a participation commitment by the device;
   associating a token specific to the device with the encrypted subset to produce a packaged subset;
   forwarding the packaged subset to the device;
   receiving a processed packaged subset in response to the forwarding of the packaged subset, the processed packaged subset including the token;
   determining from the token of the processed packaged subset the compute time contributed by the device; and
   determining an incentive package for the device based on the compute time contributed by the device to increase participation by the device.

2. The computer program product of claim 1, the program instructions being further executable by the hardware processor to cause the hardware processor to perform:
   surveying a status of the device to determine if the device has consent to participate in a massive computational operation associated with the encrypted data.

3. The computer program product of claim 1, wherein the device is one of a plurality of devices, each device being communicated a corresponding packaged subset based on the plurality of encrypted subsets being associated with a plurality of tokens.

4. The computer program product of claim 1, the program instructions being further executable by the hardware processor to cause the hardware processor to perform:
   providing a program for installation to the device, the program being configured to process the packaged subset.

5. The computer program product of claim 1, the program instructions being further executable by the hardware processor to cause the hardware processor to perform:
   validating the processed packaged subset as processed by the device.

6. The computer program product of claim 1, wherein the incentive package comprises monetary giveaways based on participation according to a payout schedule.

7. A system for determining a compute amount contributed by a device, comprising:
   a memory having computer readable instructions; and
   a hardware processor for executing the computer readable instructions, the computer readable instructions including:
   receiving encrypted data from a hardware processor of a customer system, wherein the encrypted data is data encrypted via homomorphic encryption;
   parsing the encrypted data into a plurality of encrypted subsets to proportionally size an encrypted subset of the plurality of encrypted subsets to a participation commitment by the device;
   associating a token specific to the device with the encrypted subset to produce a packaged subset;
   forwarding the packaged subset to the device; and
   receiving a processed packaged subset in response to the forwarding of the packaged subset, the processed packaged subset including the token;
   determining from the token of the processed packaged subset the compute time contributed by the device; and
   determining an incentive package for the device based on the compute time contributed by the device to increase participation by the device.

8. The system of claim 7, further comprising:
   surveying a status of the device to determine if the device has consent to participate in a massive computational operation associated with the encrypted data.

9. The system of claim 7, wherein the device is one of a plurality of devices, each device being communicated a corresponding packaged subset based on the plurality of encrypted subsets being associated with a plurality of tokens.

10. The system of claim 7, further comprising:
    providing a program for installation to the device, the program being configured to process the packaged subset.

11. The system of claim 7, further comprising:
validate the processed packaged subset as processed by the device.

\* \* \* \* \*